US008944509B2

(12) United States Patent
Ootaki

(10) Patent No.: US 8,944,509 B2
(45) Date of Patent: Feb. 3, 2015

(54) RECLINING DEVICE

(71) Applicant: Shiroki Corporation, Fujisawa-shi, Kanagawa (JP)

(72) Inventor: Hideki Ootaki, Fujisawa (JP)

(73) Assignee: Shiroki Corporation, Kanagawa (JP)

( * ) Notice: Subject to any disclaimer, the term of this patent is extended or adjusted under 35 U.S.C. 154(b) by 37 days.

(21) Appl. No.: 13/831,320

(22) Filed: Mar. 14, 2013

(65) Prior Publication Data
US 2013/0264858 A1 Oct. 10, 2013

(30) Foreign Application Priority Data

Apr. 5, 2012 (JP) .................................. 2012-086426

(51) Int. Cl.
*B60N 2/235* (2006.01)
*B60N 2/02* (2006.01)

(52) U.S. Cl.
CPC ................ *B60N 2/02* (2013.01); *B60N 2/2356* (2013.01)
USPC .................. 297/367 R; 297/367 L; 297/463.2

(58) Field of Classification Search
USPC ............ 297/362, 367 L, 367 P, 367 R, 463.1, 297/463.2
See application file for complete search history.

(56) References Cited

U.S. PATENT DOCUMENTS

| 5,524,970 | A * | 6/1996 | Kienke et al. ................. 297/362 |
| 5,634,689 | A * | 6/1997 | Putsch et al. .................. 297/362 |
| 7,090,299 | B2 * | 8/2006 | Lange ............................ 297/362 |
| 7,285,067 | B2 * | 10/2007 | Krambeck et al. ............ 475/162 |
| 7,461,900 | B2 * | 12/2008 | Lange ........................ 297/367 R |
| 7,513,572 | B2 * | 4/2009 | Kawashima .................. 297/362 |
| 7,607,737 | B2 * | 10/2009 | Liebich et al. ................ 297/362 |
| 7,789,464 | B2 * | 9/2010 | Stemmer et al. .............. 297/362 |
| 7,828,386 | B2 * | 11/2010 | Reubeuze et al. ......... 297/367 P |
| 2013/0270883 | A1 * | 10/2013 | Becker et al. .............. 297/367 P |

FOREIGN PATENT DOCUMENTS

JP 4032806 B2 11/2007

* cited by examiner

*Primary Examiner* — Peter Brown
(74) *Attorney, Agent, or Firm* — Cheng Law Group, PLLC

(57) ABSTRACT

A reclining device includes: a first member attached to one of a seat back and a seat cushion and having an attachment protrusion with an erected wall surface; a second member fitted into the first member and attached to the other member of the seat back and the seat cushion; a lock mechanism that controls relative rotation of the first and second members; an operation member that controls the lock mechanism; a spring disposed at the first member and biases the operation member; and a spring cover covering the spring, the spring cover having an elastic protrusion that can press-contact the erected wall surface of the attachment protrusion of the first member.

8 Claims, 8 Drawing Sheets

RECLINING DEVICE

CROSS-REFERENCE TO RELATED APPLICATION

This application is based on Japanese Patent Application No. 2012-86476 filed with the Japan Patent Office on Apr. 5, 2012, the entire content of which is hereby incorporated by reference.

BACKGROUND

1. Technical Field

The disclosure herein relates to a reclining device with a spring on the outside thereof.

2. Related Art

A reclining device is biased by a spring so as to be in a locked state during a non-operating time.

This spring is generally built in the reclining devices. However, some small-sized reclining devices have springs on the outsides thereof, respectively. For example, Japanese Patent No. 4032806 discloses a reclining device with a spring on the outside thereof. This reclining device includes a spring cover to prevent a spring from dropping out. The spring cover also prevents foreign matters and/or sputters generated by welding of the reclining device to a seat from entering into the reclining device. That is, the spring cover can prevent occurrence of lock failure.

SUMMARY

A reclining device includes: a first member attached to one member of a seat back-side member and a seat cushion-side member, and having an outside exposure surface and an attachment protrusion with an erected wall surface formed on the outside exposure surface; a second member fitted into the first member so as to be capable of relative rotation with respect to the first member, and attached to the other member of the seat back-side member and the seat cushion-side member; a lock mechanism configured to cause a locked state in which relative rotation of the first and second members is controlled or an unlocked state in which the relative rotation is enabled; an operation member disposed on an axis of the relative rotation, the operation member having a protrusion protruding outward from the outside exposure surface of the first member, and configured to rotate to switch the lock mechanism between the locked state and the unlocked state; a spring disposed at the first member so as to be at least partially exposed to the outside, locked at one end part on the first member, locked at the other end part on the protrusion of the operation member, and biases the operation member to bring the lock mechanism into the locked state; and a spring cover covering the spring, the spring cover having a top part, an erected wall part crossing the outside exposure surface of the first member, and an elastic protrusion formed on an outer surface of the erected wall part and can press-contact the erected wall surface of the attachment protrusion of the first member.

DETAILED DESCRIPTION

Figure 1:
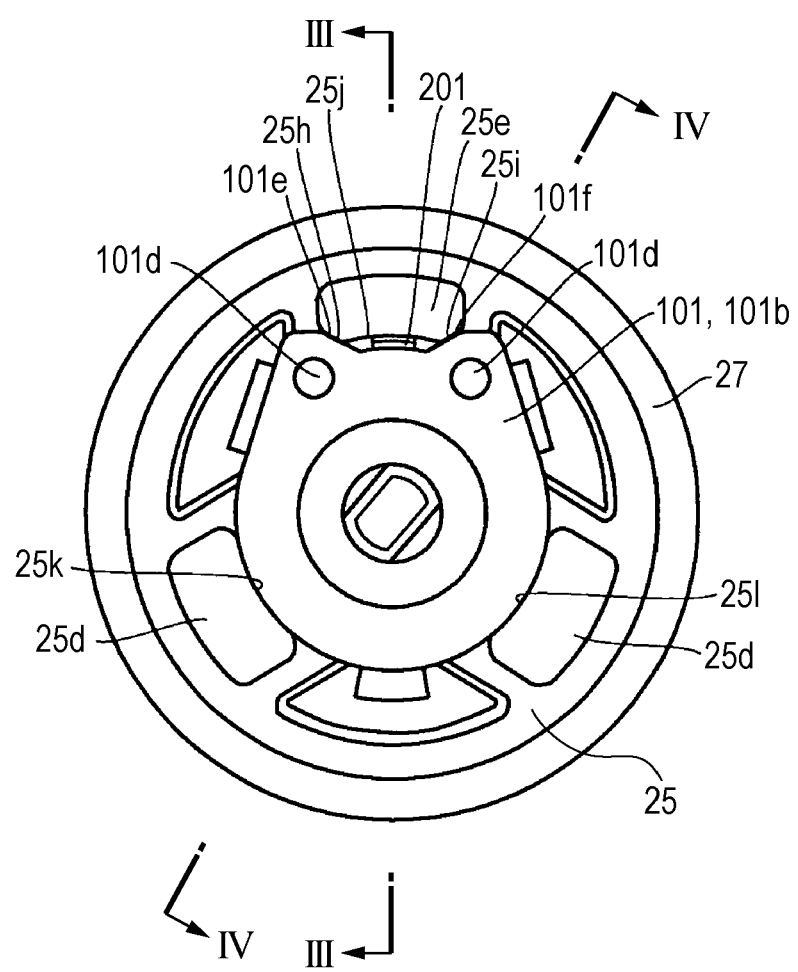
FIG. 1 is a diagram depicting a part of a reclining device of a first embodiment as viewed in the direction along an arrow I in FIG. 2.

In the following detailed description, for purpose of explanation, numerous specific details are set forth in order to provide a thorough understanding of the disclosed embodiments It will be apparent, however, that one or more embodiments may be practiced without these specific details. In other instances, well-known structures and devices are schematically depicted in order to simplify the drawing.

The spring cover disclosed in Japanese Patent No. 4032806 is swaged to the reclining device. Accordingly, the assembly procedure for the reclining device requires an additional swaging step. Further, a portion of the reclining device with the spring cover is quenched and thus hardened. This makes it difficult to control the accuracy of swaging. As a result, it is difficult to assemble the spring cover to the reclining device.

An object of the invention is to provide a reclining device to which a spring cover can be easily assembled.

A reclining device of the disclosure (the present device) includes: a first member attached to one member of a seat back-side member and a seat cushion-side member, and having an outside exposure surface and an attachment protrusion with an erected wall surface formed on the outside exposure surface; a second member fitted into the first member so as to be capable of relative rotation with respect to the first member, and attached to the other member of the seat back-side member and the seat cushion-side member; a lock mechanism configured to cause a locked state in which relative rotation of the first and second members is controlled or an unlocked state in which the relative rotation is enabled; an operation member disposed on an axis of the relative rotation, the operation member having a protrusion protruding outward from the outside exposure surface of the first member, and configured to rotate to switch the lock mechanism between the locked state and the unlocked state; a spring disposed at the first member so as to be at least partially exposed to the outside, locked at one end part on the first member, locked at the other end part on the protrusion of the operation member, and biases the operation member to bring the lock mechanism into the locked state; and a spring cover covering the spring, the spring cover having a top part, an erected wall part crossing the outside exposure surface of the first member, and an elastic protrusion formed on an outer surface of the erected wall part and can press-contact the erected wall surface of the attachment protrusion of the first member.

According to the foregoing device, the spring cover has the erected wall part that crosses the outside exposure surface of the first member. The first member has the attachment protrusion on the outside exposure surface. The attachment protrusion has the erected wall surface that is opposed to the external surface of the erected wall part of the spring cover. The spring cover has the protrusion on the erected wall part.

The protrusion has an elastic force to press-contact the erected wall surface of the attachment protrusion. When the spring cover is pressed against the erected wall surface (surface to be press-contacted) of the first member, the spring cover is fixed to the first member. Accordingly, the spring cover can be easily assembled to the first member.

<First Embodiment>

A first embodiment of the disclosure herein will be described with reference to the drawings.

Figure 2:
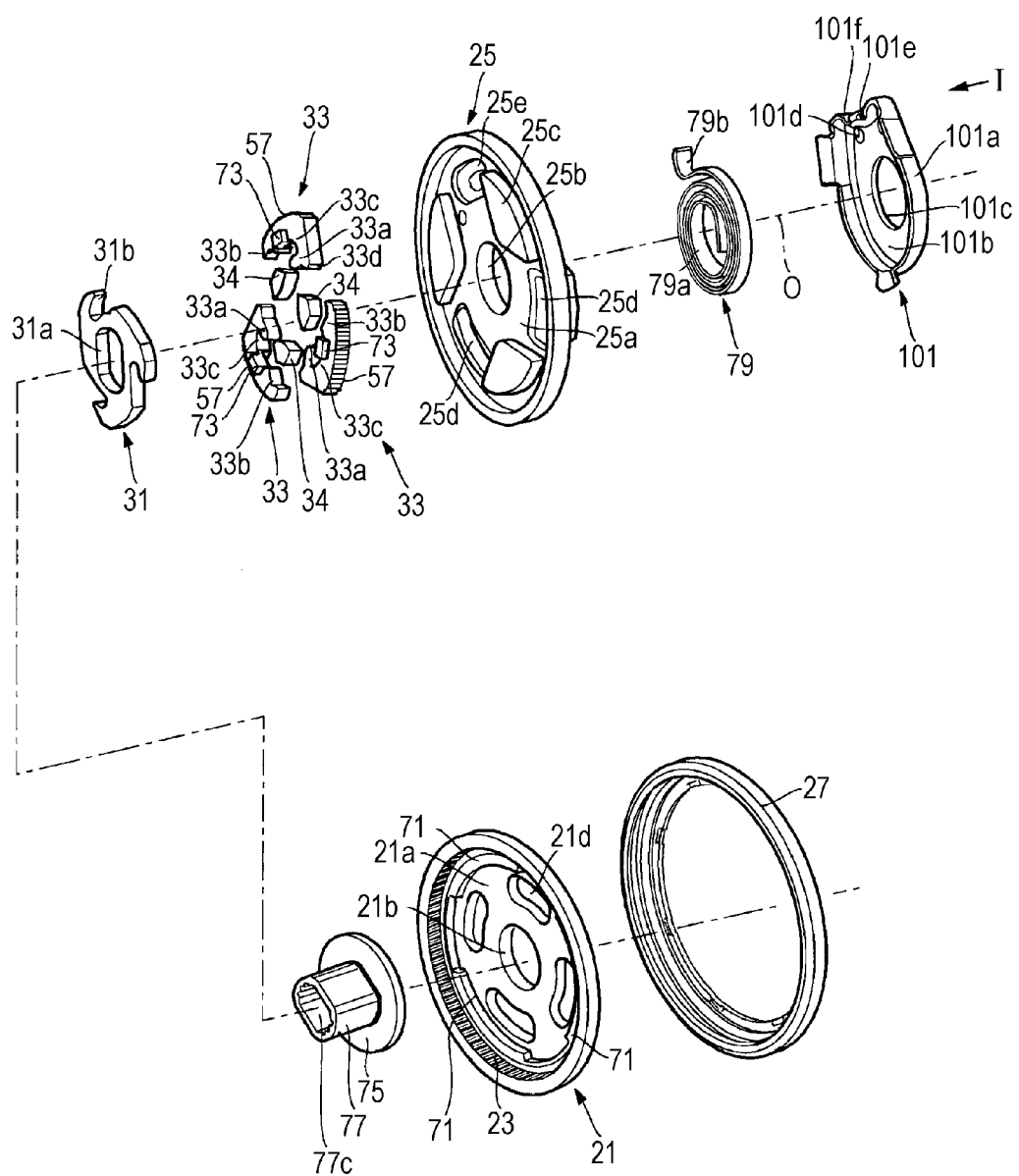
FIG. 2 is an exploded perspective view of a reclining device of the embodiment.
Figure 3:
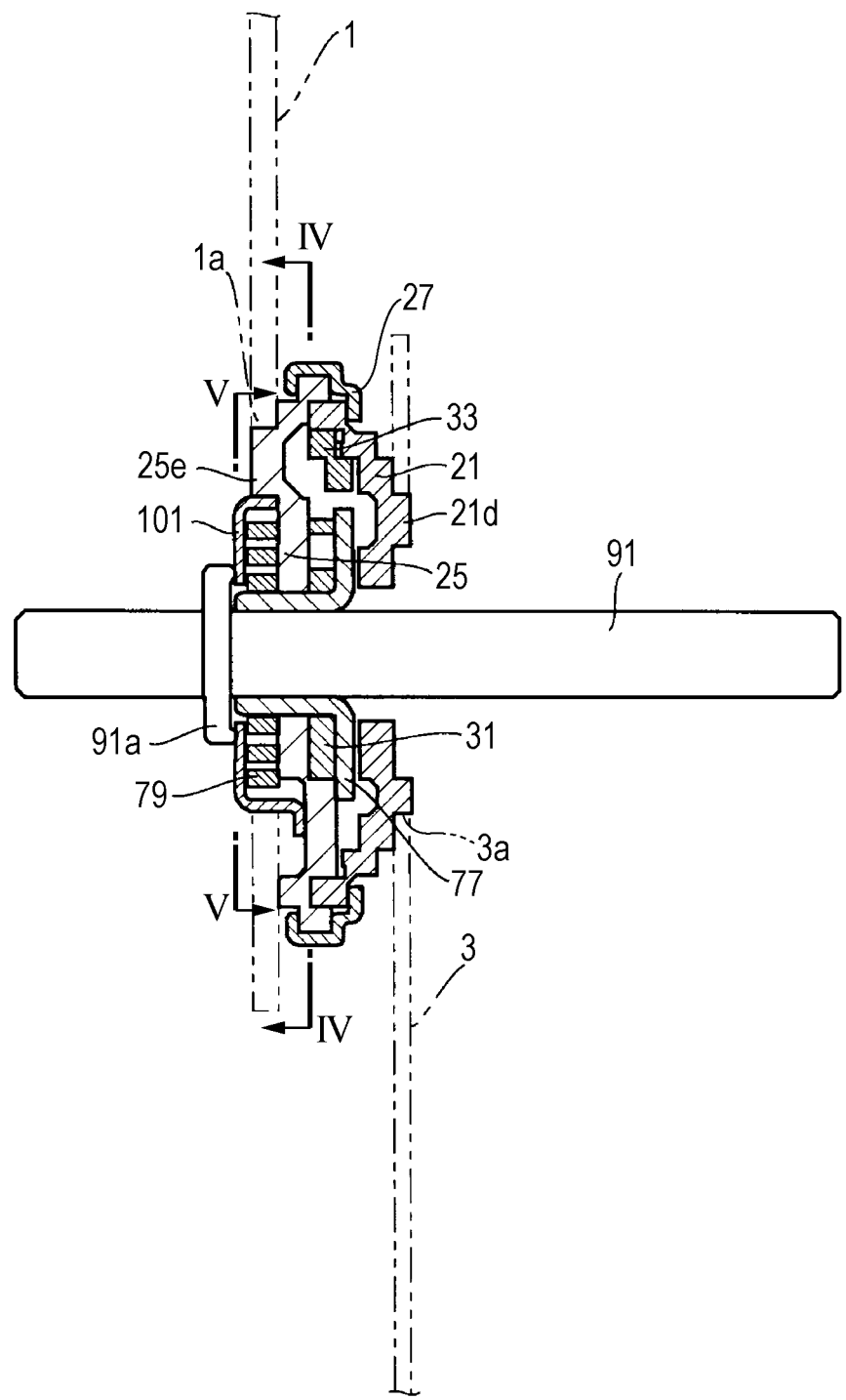
FIG. 3 is a diagram depicting an end surface in FIG. 1 along section line
Figure 4:
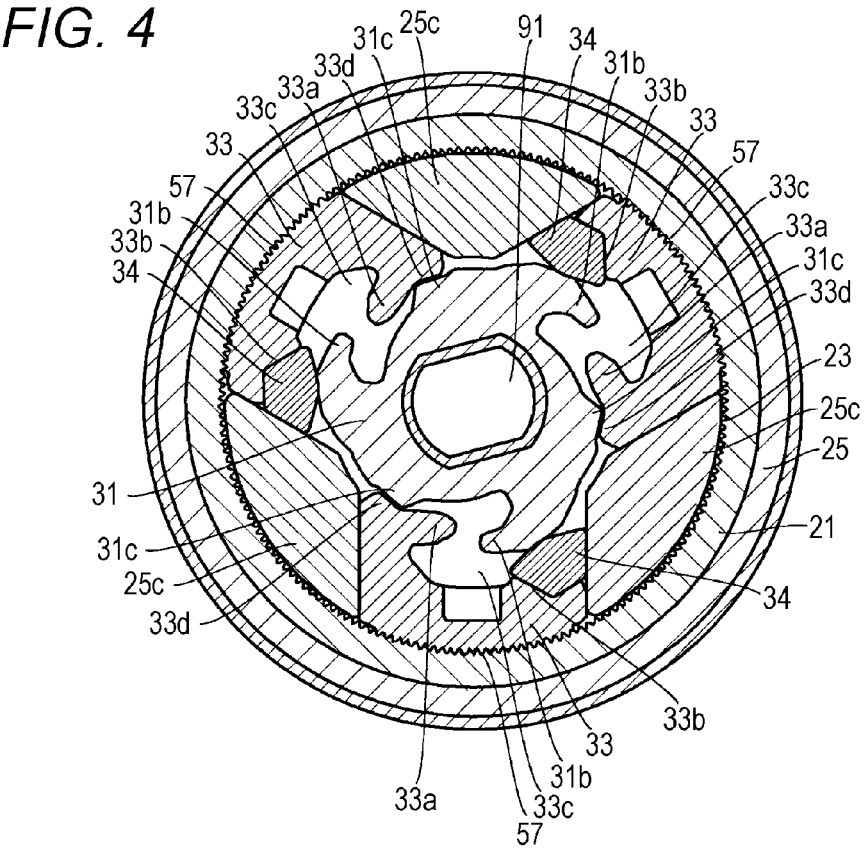
FIG. 4 is a diagram depicting an end surface in FIG. 3 along section line IV-IV.
Figure 5:
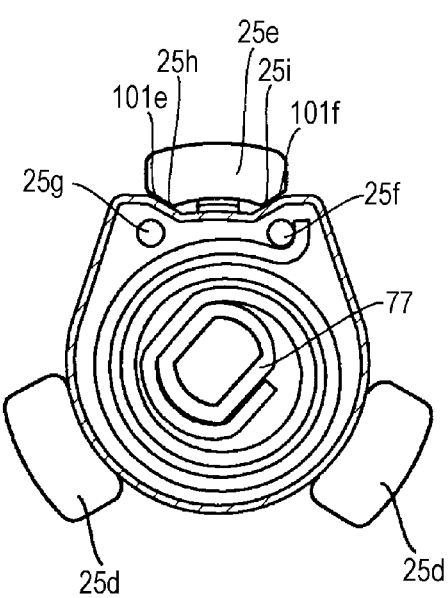
FIG. 5 is a diagram depicting an end surface in FIG. 3 along section V-V.
Figure 6:
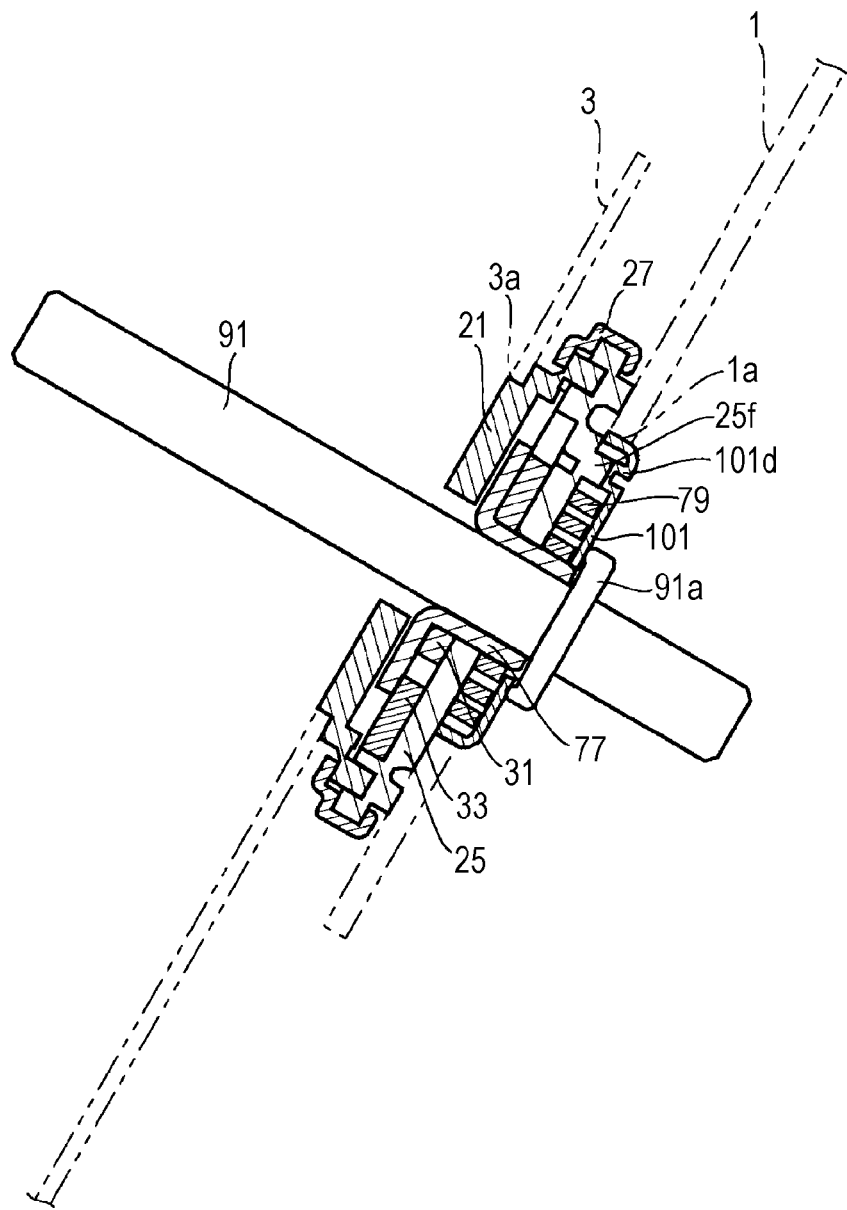
FIG. 6 is a diagram depicting an end surface in FIG. 1 along section line VI-VI.

Referring to FIGS. 1 to 6, an entire configuration of the reclining device in the embodiment will be described. FIG. 1 is a diagram depicting a part of the reclining device in the embodiment as viewed in a direction along an arrow I in FIG. 2. FIG. 2 is an exploded perspective view of the reclining device in the first embodiment. FIG. 3 is a diagram depicting an end surface in FIG. 1 taken along section line III-III. FIG. 4 is a diagram depicting an end surface in FIG. 3 taken along section line IV-IV. FIG. 5 is a diagram depicting an end surface in FIG. 3 taken along section line V-V. FIG. 6 is a diagram depicting an end surface in FIG. 1 taken along section line VI-VI;

As depicted in these drawings, a latchet (a second member) 21 is provided at a seat cushion side. The latchet 21 is formed by pressing and semi-punching a disc-shaped plate material. The latchet 21 has a bottomed cylindrical shape with one open surface. The latchet 21 has inner teeth 23 on an inner cylindrical surface thereof along an entire periphery. The latchet 21 has a penetration hole 21b formed in the center of a bottom part 21a thereof.

A base plate (a first member) 25 is provided at a seat back side. The base plate 25 is also formed by pressing and semi-punching a disc-shaped plate material. The base plate 25 also has a bottomed cylindrical shape with one open surface. The bottomed cylinder has a bottom part 25a with an inner diameter slightly larger than an outer diameter of the latchet 21. When the latchet 21 is fitted into the bottom part 25a, the base plate 25 and the latchet 21 are relatively rotatable around axis O. The base plate 25 has a penetration hole 25b on the center thereof. The latchet 21 has on the bottom part 21a four attachment protrusions 21d that protrude in a direction opposite to the base plate 25. The attachment protrusions 21d engage an attachment hole 3a (see FIGS. 3 and 6) formed in the seat cushion-side member 3. Specifically, these attachment protrusions 21d are formed on the outside exposure surface of the latchet (the second member) 21.

An outer peripheral part of the latchet 21 and an outer peripheral part of the base plate 25 are sandwiched by an outer peripheral ring 27. The outer peripheral ring 27 holds the latchet 21 and the base plate 25 so as not to be separated in an axial direction (O) of relative rotation and so as to be capable of relative rotation.

The bottom part 21a of the latchet 21 and the bottom part 25a of the base plate 25 form a space in which a rotation cam (first cam) 31 is arranged. The rotation cam 31 has a non-circular (oval) penetration hole 31a on the center thereof.

Three poles 33 are arranged on the latchet 21 so as to be positioned on the outside of the rotation cam 31. The poles 33 have outer teeth 57 capable of engaging with the inner teeth 23.

The base plate 25 has on the bottom part 25a guides 25c that protrude in a direction toward the latchet 21. The guides 25c guide the poles 33 in a radial direction of the relative rotation. Accordingly, the poles 33 can move in the radial direction of the relative rotation. Further, the base plate 25 has on the bottom part 25a two attachment protrusions 25d and one attachment protrusion 25e that protrude in a direction opposite to the latchet 21. These attachment protrusions 25d and 25e engage in the attachment holes 1a (see FIGS. 3 and 6) formed in the seat hack-side member 1. Specifically, these attachment protrusions 25d and 25e are formed on the outside exposure surface of the base plate (the first member) 25.

The attachment protrusions 25d and 25e are each shaped such that a circular ring is divided with different radiuses to circular ring-shaped protrusion is divided with a predetermined width). The attachment protrusion 25e is cut at a corner formed by an inner circle and a radius (corner formed by an inner circle and a side portion extending in a radial direction). The cutting forms a first stopper surface 25h and a second stopper surface 25i described later.

Cams (second cams) 34 are arranged among the poles 33, the rotation cam 31. and the guides 25c.

The poles 33 have concaves 33c and hooks 33a on surfaces opposite to the surfaces with the outer teeth 57. The concaves 33c extend in a direction crossing the radial direction of the relative rotation.

Meanwhile, the rotation cam 31 has on the periphery thereof three hooks 31b that are capable of entering into the concaves 33c of the poles 33. The poles 33 have lock surfaces 33b against which the cams 34 can abut, on the surfaces opposite to the surfaces with the outer teeth 57. The lock surfaces 33b cross the radial direction of the relative rotation. When the lock surfaces 33b are pressed by the cams 34, two forces act on the Stock surfaces 33b: a force for pressing the poles 33 against the guides 25c and a force for moving the poles 33 in a direction in which the outer teeth 57 engage the inner teeth 23 (the radial direction of the relative rotation).

The hooks 33a of the poles 33 have rotation cam abutment portions 33d. The rotation cam 31 has cam abutment parts 31c formed at portions without the hooks 31b. The rotation cam abutment parts 33d can abutment parts 31c.

When the rotation cam 31 rotates in one direction (counterclockwise in FIG. 4), the hooks 31b of the rotation cam 31 is brought into press-contact with the cams 34. Then, the cams 34 are brought into press-contact with the guides 25c and the lock surfaces 33b of the poles 33. Accordingly, the poles 33 move in a direction in which to separate from the axis of the relative rotation (direction radially outward from the axis of the relative rotation). Thus, the outer teeth 57 of the poles 33 engage the inner teeth 23 of the latchet 21. That is, the poles 33 are brought into the locked state.

At that time, a gap is created between the cam abutment parts 31c of the rotation cam 31 and the rotation cam abutment pans 33d of the poles 33.

In the embodiment, an unlocked state maintaining mechanism is provided with circular guides 71 and protrusions 73. The guides 71 are formed on the inner cylindrical surface of the latchet 21 nearer the bottom part 21a than the inner teeth 23. The guides 71 are three circular guides along a circumferential direction, The protrusions 73 are formed by a semi-punching process on surfaces of the poles 33 opposed to the bottom part 21a of the latchet 21.

When the protrusions 73 of the poles 33 abut the circular guides 71, the poles 33 are held in an unlock position. In the unlock position, the outer teeth 57 and the inner teeth 23 of the latchet 21 are disengaged.

An operation member 77 is fitted into the non-circular penetration hole 31a of the rotation cam 31. The operation member 77 has a non-circular (oval) cross section. The operation member 77 rotates integrally with the rotation cam 31. The operation member 77 is formed in a cylindrical shape with both end surfaces opened. The operation member 77 has a flange part 75 that overhangs in a radial direction of the operation member 77 on an entire peripheral area of an outer peripheral surface thereof. The flange part 75 abuts the bottom part 21a of the latchet 21. The flange part 75 suppresses (or disables) inclination of the operation member 77 in almost all directions with respect to the bottom part 21a of the latchet 21. In the embodiment, the flange part 75 is one continuous flange (integral flange) formed over the entire peripheral area of the outer peripheral surface of the operation member 77.

Height of the operation member 77 is set such that the operation member 77 is exposed to the outside through the penetration hole 25b of the base plate 25.

Two spring lock protrusions 25f and 25g are formed on the outside exposure surface of the base plate 25, nearer the center of the base plate 25 than the attachment protrusion 25e (see FIG. 5)

A spiral spring 79 is arranged on the outside exposure surface of the base plate 25 with the attachment protrusions 25d and 25e. The spiral spring 79 is formed by processing an elongated spring plate material into a spiral form. An inner end part 79a of the spiral spring 79 is locked at the operation member 77 by being wound around the operation member 77. The spiral spring 79 has an outer end part locked at, of the two spring lock protrusions 25f and 25g in the base plate 25, the spring Stock protrusion 25f. The poles 33 are biased toward a lock position via the rotation cam 31 by a biasing force of the spiral spring 79.

The reclining device in the embodiment has a shaft 91 attached to the operation member 77 and driven by an operation handle or the like, as depicted in FIGS. 3 and 6. The shaft 91 has a non-circular cross section that can be fitted into the hole of the operation member 77. When fitted into the hole of the operation member 77, the shaft 91 rotates integrally with the operation member 77.

Further, a spring cover 101 covering the spiral spring 79 is provided on the outside exposure surface of the base plate 25.

The spring cover 101 will be described below with reference to FIGS. 1 to 3 and 5 to 9.

The spring cover 101 has an erected wall part 101a and a top part 101b. The erected wall part 101a crosses the outside exposure surface of the base plate 25 (in the embodiment, the erected wall part 101a is orthogonal to the outside exposure surface of the base plate 25). The top part 101b bents from a leading end of the erected wall part 101a, and is parallel to the outside exposure surface of the base plate (the first member) 25. The top part 101b has a hole 101c opposed to an end surface of the operation member 77. The shaft 91 is inserted into the spring cover 101 through the hole 101c. Accordingly, the shaft 91 is fitted into the inner peripheral part (hole) 77c of the operation member 77. In the embodiment, the shaft 91 has a flange part 91a. The flange part 91a abuts from the outside the peripheral part of the hole 101c in the top part 101b of the spring cover 101.

The top part 101b of the spring cover 101 has two protrusions 101d. The protrusions 101d are opposed to the two spring lock protrusions 25f and 25g on the base plate 25. The protrusions 101d protrude in a direction toward the inside of the spring cover 101. The end part of the spiral spring 79 locked at the spring lock protrusion 25f can abut the protrusions 101d.

The spring cover 101 in the embodiment is manufactured by a pressing process. The die of the press used in the pressing process has a draft angle. Accordingly, the diameter of the erected wall part 101a is larger downward from the top part 101b.

Meanwhile, the attachment protrusion 25e of the base plate 25 has a first stopper surface 25h and a second stopper surface 25i. The first stopper surface 25h and the second stopper surface 25i are formed by cutting out corners in between an inner circular arc and a radius of the attachment protrusion 25e. The first stopper surface 25h and the second stopper surface 25i are opposed to the erected wall part 101a of the spring cover 101, and cross the rotational direction on the axis of the relative rotation.

The erected wall part 101a of the spring cover 101 has a first rotation control surface 101e and a second rotation control surface 101f. The first rotation control surface 101e abuts the first stopper surface 25h of the attachment protrusion 25e. The first rotation control surface 101e controls the rotation of the spring cover 101 in one direction on the outside exposure surface of the base plate (the first member) 25. The second rotation control surface 101f abuts the second stopper surface 25i of the attachment protrusion 25e. The second rotation control surface 101f controls the rotation of the spring cover 101 in the other direction on the eternal exposure surface of the base plate (the first member) 25.

The foregoing spring lock protrusions 25f and 25g are positioned inside the spring cover 101. The spring lock protrusion 25g functions also as a protrusion opposed to the first rotation control surface 101e (opposed to the rotational direction). The spring lock protrusion 25f functions also as a protrusion opposed to the second rotation control surface 101f (opposed to the rotational direction)

The first rotation control surface 101e and the second rotation control surface 101f in the embodiment are planar surfaces that cross the direction of rotation of the spring cover 101 on the outside exposure surface of the base plate 25.

The erected wall part 101a of the spring cover 101 has two opposed tongue parts, a tongue part 101g and a tongue part 101h. The tongue parts 101g and 101h face a back surface of the seat back-side member 1 via the attachment hole la of the seat back-side member 1.

Operations of the reclining device in the embodiment (operations of the lock mechanism in the embodiment) will be described below.

As depicted in FIG. 4, when no operational force is applied to the rotation cam 31, the rotation cam 31 rotates in one direction (counterclockwise in FIG. 4) by a biasing force of the spiral spring 79. As a result, hooks 31b of the rotation cam 31 press-contact the lock surfaces 33b of the poles 33 via the cams 34. When the lock surfaces 33b of the poles 33 are pressed, a force of moving the poles 33 in a direction in which the outer teeth 57 engage the inner teeth 23 (the radial direction of the relative rotation) is generated. Then, the outer teeth 57 of the poles 33 engage the inner teeth 23 of the latchet 21. That is, the poles 33 are brought into a lock position Accordingly, the relative rotation of the latchet 21 and the base plate 25 is suppressed (or disabled). That is, the lock mechanism enters a locked state. Therefore, the seat back is brought into a state in which the seat back can hardly rotate with respect to the seat cushion (locked state).

When the shaft 91 is rotated against a biasing force of the spiral spring 79, the rotation cam 31 (the operation member 77) rotates in the other direction (clockwise in FIG. 4). Accordingly, the hooks 31b of the rotation cam 31 enter into concaves 33c of the poles 33. The hooks 31b engage the hooks 33a of the poles 33 (the hooks 31b press-contact the inner wall surfaces of the concaves 33c at the rotation center side of relative rotation), thereby to raise the poles 33 toward the axis of the relative rotation. Thus, the poles 33 enters into an unlock position (full-open state) depicted in FIG. 5 in which the outer teeth 57 and the inner teeth 23 of the latchet 21 are disengaged. This allows relative rotation of the latchet 21 and the base plate 25. That is, the lock mechanism enters into an unlocked state. Therefore, the seat back is brought into a state that the seat back can rotate with respect to the seat cushion (unlocked state).

After a desired rotation angle of the seat back with respect to the seat cushion is obtained, the shaft 91 is released, from the operational force. Accordingly, the rotation cam 31 rotates counterclockwise by a biasing force of the spiral spring 79.

When the rotation cam 31 rotates counterclockwise, first, the cam abutment part 31c of the rotation cam 31 abuts the rotation cam abutment pans 33d of the poles 33 to press the poles 33 in the lock direction.

Further, when the rotation cam 31 rotates, the cam abutment part 31c of the rotation cam 31 abuts the rotation cam abutment parts 33d of the poles 33 to press-contact the poles 33 in the lock direction. At the same time, the hooks 31b of the rotation cam 31 start to press-contact the cams 34. Accordingly, the cams 34 start to move toward the lock surfaces 33b of the poles 33. While the cam abutment part 31c of the rotation cam 31 abuts the rotation cam abutment parts 33d of the poles 33 to press-contact the poles 33 in the lock direction. At that time, the hooks 31b of the rotation cam 31 start to press-contact the lock surfaces 33b of the poles 33 via the cams 34.

Further, when the rotation cam 31 rotates, the cam abutment part 31c of the rotation cam 31 starts to separate from the rotation cam abutment parts 33d of the poles 33. In reverse, the hooks 31b of the rotation cam 31 start to press-contact the lock surfaces 33b of the poles 33 via the cams 34. The rotation cam 31 rotates to press the poles 33 to the lock position depicted in FIG. 4. Accordingly, the seat back returns to the locked state in which the outer teeth 57 of the poles 33 and the inner teeth 23 of the latchet 21 engage with no backlash.

The seat back may be situated between state in which the seat back is erected to enable seating (initial locked state) and a state in which the seat back is forward-bending (the seat back bends more forward than in the initial locked state). In this case, the seat back can rotate without operating the operation member 77.

Specifically, even when the operation member 77 is released from the operational force, the foregoing unlocked state maintaining mechanism holds the poles 33 in the unlock position. That is, when the seat back is situated between the initial locked state and the forward-bending state, the protrusions 73 of the poles 33 are positioned on the circular guides 71. Accordingly, even when the operation member 77 is released from the operational force, the poles 33 are held in the unlock position. As a result, the relative rotation of the latchet 21 and the base plate 25 is enabled.

Figure 7:
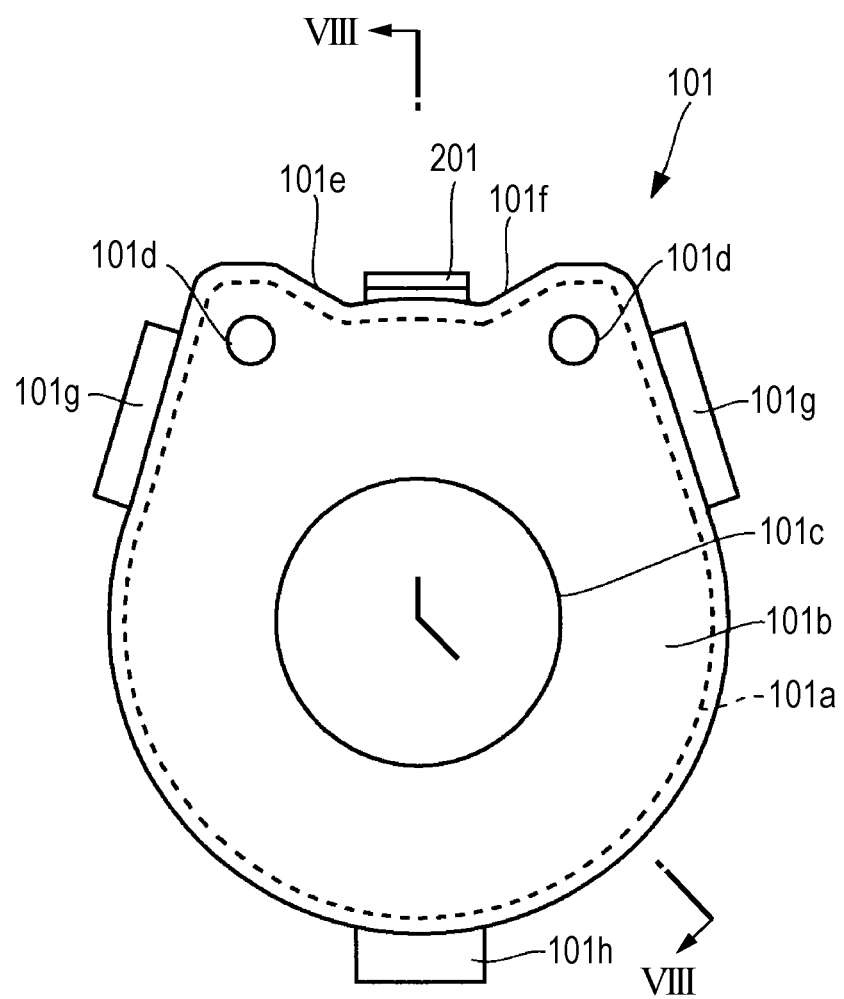
FIG. 7 is a front view of a spring cover in FIG. 1.
Figure 8:
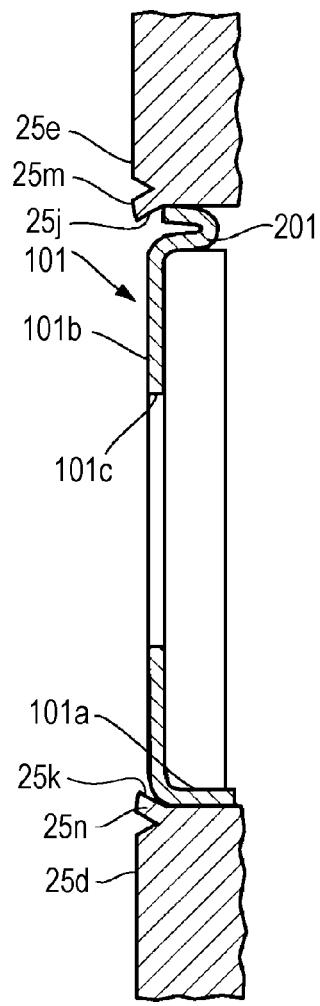
FIG. 8 is a diagram depicting an end surface in FIG. 7 along section line VIII-VIII.
Figure 9:
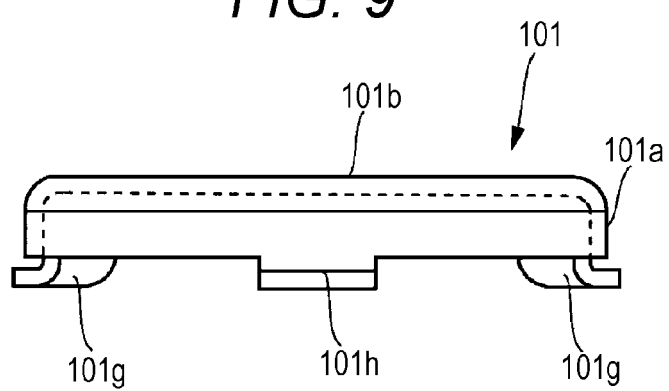
FIG. 9 is a side view of the spring cover in FIG. 7, as viewed from the bottom of FIG. 7.

As depicted in FIGS. 1, 7, and 8, the spring cover 101 has a protrusion. The protrusion has an elastic force that is capable of press-contacting an erected wall surface 25j between the first stopper surface 25h and the second stopper surface 25i of the attachment protrusion 25e. The protrusion in the embodiment is a pawl 201. The pawl 201 is bent to run from a lower portion of the erected wall part 101a of the spring cover 101 toward the top part 101b of the spring cover 101, and to extend in a direction away from the erected wall part 101a of the spring cover 101.

The erected wall part 101a of the spring cover 101 is pressed by an elastic repulsion force of the pawl 201 against the two attachment protrusions 25d of the base plate 25. Specifically, the erected wall part 101a is pressed against an erected wall surface (contacted and pressed surface) 25k of one attachment protrusion 25d and an erected wall surface (contacted and pressed surface) 25l of the other attachment protrusion 25d. This allows the erected wall part 101a of the spring cover 101 to be supported at three points. Accordingly, the spring cover 101 is fixed to the base plate 25.

As depicted in FIG. 8, a protrusion 25m is formed at an upper part of the erected wall surface 25j of the attachment protrusion 25e. The protrusion 25m protrudes in a direction toward the erected wall part 101a of the spring cover 101. In addition, a protrusion 25n is formed at an upper part of the erected wall surface 25k of one of the two attachment protrusions 25d. The protrusion 25n protrudes in a direction toward the erected wall part 101a of the spring cover 101. Further, a protrusion (not depicted) is formed at an upper part of the erected wall surface (contacted and pressed surface) 25l of the other attachment protrusion 25d. The protrusion protrudes in a direction toward the erected wall part 101a of the spring cover 101.

These protrusions are formed using a punch or the like. Specifically, the protrusion 25n is formed by plastically deforming with a punch or the like the top part of the attachment protrusion 25e in the vicinity of the erected wall surface 25j of the attachment protrusion 25e. The protrusion 25n is formed by plastically deforming with a punch or the like the top part of the one attachment protrusion 25d in the vicinity of the erected wall surface (contacted and pressed surface) 25k. The protrusion not depicted is formed by plastically deforming with a punch or the like the top part of the other attachment protrusion 25d in the vicinity of the erected wall surface (contacted and pressed surface) 25l.

The protrusion formed on the erected wall surface 25j of the base plate 25 is intended to inhibit (make it difficult to cause) falling out of the spring cover 101 along the axial direction of the relative rotation of the latchet 21 and the base plate 25.

According to the foregoing configuration, the following advantages can be obtained.

(1) When the spring cover 101 is pressed and fitted into between the attachment protrusion 25e and the two attachment protrusions 25d, the pawl 201 of the spring cover 101 presses the erected wall surface 25j of the attachment protrusion 25e. The erected wall part 101a of the spring cover 101 is pressed by an elastic repulsion force of the pawl 201 against the erected wall surface (contacted and pressed surface) 25k of the one attachment protrusion 25d and the erected wall surface (contacted and pressed surface) 25l of the other attachment protrusion 25d. Accordingly, the erected wall part 101a of the spring cover 101 is supported at three points. As a result, the spring cover 101 is fixed to the base plate 25 with no backlash. In this arrangement, the spring cover 101 can be more easily assembled to the base plate 25 as compared to the cases of using swaging, welding, or other methods.

(2) The pawl 201 is used as a protrusion for press-contacting the erected wall surface 25j of the attachment protrusion 25e. This allows the protrusion pressing the erected wall surface 25j of the attachment protrusion 25e to have a longer stroke in a press-contacting direction. Specifically, the pawl 201 is bent to run from the lower portion of the erected wall part 101a of the spring cover 101 toward the top part 101b of the spring cover 101, and to extend in a direction away from the erected wall part 101a of the spring cover 101. Accordingly, even if there are large errors (variations) in outer dimensions of the spring cover 101, outer dimensions of the attachment protrusion 25e and the two attachment protrusions 25d, and position of formation of these protrusions, these errors can be absorbed.

(3) The protrusions are formed at the upper parts of the erected wall surfaces of the attachment protrusion 25d and 25e, This inhibits falling out of the spring cover 101 along the axial direction of the relative rotation of the latchet 21 and the base plate 25.

<Second Embodiment>

Figure 10:
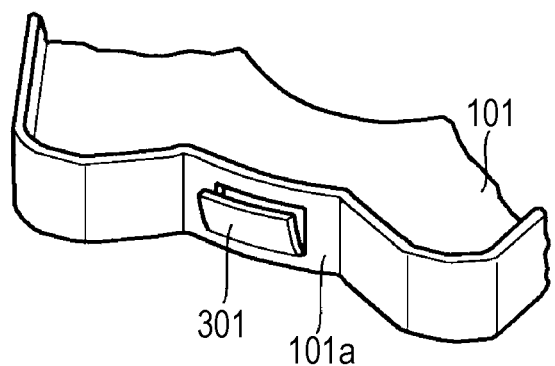
FIG. 10 is a perspective view of a second embodiment.

The spring cover 101 may have a cut-and-raised piece 301 as depicted in FIG. 10, as an elastic, protrusion that can press-contact the erected wall surface 25j of the attachment protrusion 25e.

The cut-and-raised piece 301 is formed at the erected wall part 101a of the spring cover 10. The cut-and-raised piece 301 has a leading end part (leading end side) that runs in a direction away from the top part 101b of the spring cover 101 and extends in a direction away from the erected wall part 101a of the spring cover 101.

The thus structured cut-and-raised piece 301 is formed at the erected wall part 101a of the spring cover 101. In this arrangement, when the spring cover 101 is pressed and fitted into between the attachment protrusion 25e and the two attachment protrusions 25d, the cut-and-raised piece 301 of the spring cover 101 presses the erected wall surface 25j of the attachment protrusion 25e. The erected wall part 101a of the spring cover 101 is pressed by an elastic repulsion force of the cut-and-raised piece 301 against the erected wall surface (contacted and pressed surface) 25k of the one attachment protrusion 25d and the erected wall surface (contacted and pressed surface) 25l of the other attachment protrusion 25d. Accordingly, the erected wall part 101a of the spring cover 101 is supported at three points. As a result, the spring cover 101 is fixed to the base plate 25 with no backlash. Therefore, the spring cover 101 can be More easily assembled to the base plate 25 as compared to the cases of using swaging, welding, or other methods.

<Third Embodiment>

Figure 11:
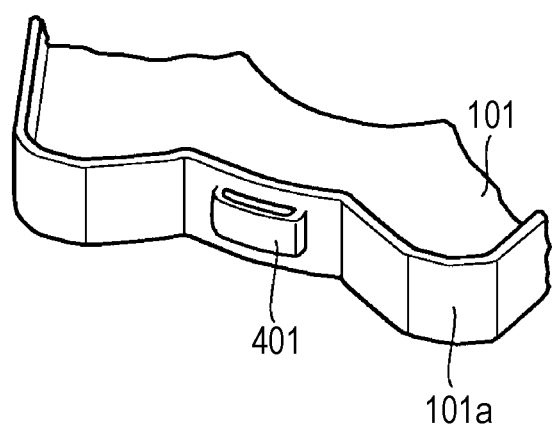
FIG. 11 is a perspective view of a third embodiment.

The spring cover 101 may have a protrusion (projection) 401 as depicted in FIG. 11, as an elastic protrusion that can press-contact the erected wall surface 25j of the attachment protrusion 25e.

The protrusion 401 is formed by plastically deforming the erected wall part 101a of the spring cover 101. The protrusion 401 protrudes in a direction away from the erected wall part 101a of the spring cover 101.

The thus structured protrusion 401 is formed at the erected wall part 101a of the spring cover 101. In this arrangement, when the spring cover 101 is pressed and fitted into between the attachment protrusion 25e and the two attachment protrusions 25d, the protrusion 401 of the spring cover 101 presses the erected wall surface 25j of the attachment protrusion 25e. The erected wall part 101a of the spring cover 101 is pressed by an elastic repulsion force of the protrusion 401 against the erected wall surface (contacted and pressed surface) 25k of the one attachment protrusion 25d and the erected wall surface (contacted and pressed surface) 25l of the other attachment protrusion 25d. Accordingly, the erected wall part 101 a of the spring cover 101 is supported at three points. As a result, the spring cover 101 is fixed to the base plate 25 with no backlash. Therefore, the spring cover 101 can be more easily assembled to the base plate 25 as compared to the cases of using swaging, welding, or other methods.

<Fourth Embodiment>

The erected wall part 101a of the spring cover 101 may be formed to come closer to the contacted and pressed surface downward from the top part 101b (to the base plate 25 side).

The spring cover 101 in the embodiment is manufactured by subjecting a metal plate material to press forming. Accordingly, the spring cover 101 can be easily formed in the shape described above.

The thus formed spring cover 101 is less prone to fall out of the base plate 25. Specifically, when the spring cover 101 moves in the axial direction of the relative rotation of the latchet 21 and the base plate 25, the erected wall part 101a of the spring cover 101 abuts the protrusion formed at the upper part of the erected wall surface 25j of the attachment protrusion 25e.

The disclosure herein is not limited to the foregoing embodiments. In the foregoing embodiments, the latchet 21 is provided at the seat cushion side, and the base plate 25 is provided at the seat back side. Alternatively, in reverse, the base plate 25 may be provided at the seat cushion side, and the latchet 21 may be provided at the seat back side.

The spiral spring 79 in the foregoing embodiments is arranged on the outside exposure surface of the base plate 25. However, the lock mechanism disclosed herein is not limited to this but may be applicable to the configuration in which the spiral spring 79 is arranged in the hole 25b of the base plate 25 and is partially exposed to the outside.

A reclining device according to the disclosure herein may be a first reclining device as described below. Specifically, the first reclining device includes: a first member attached to one member of a seat back-side member and a seat cushion-side member; a second member that is stacked on the first member, capable of relative rotation with respect to the first member, and attached to the other member of the seat back-side member and the seat cushion-side member; a lock mechanism that brings the first and second members into a locked state in which relative rotation of the first and second members is disabled or brings the first and second members into an unlocked state in which the relative rotation is enabled; an operation member disposed on an axis of the relative rotation, has a protrusion protruding outward from an outside exposure surface exposed on outside of the first member, and rotates to switch between the locked state and the unlocked state of the lock mechanism; a spring disposed at the first member so as to be at least partially exposed to the outside, locked at one end part on the first member, locked at the protrusion of the other end part on the operation member, and biases the operation member to bring the lock mechanism into the locked state; and a spring cover that is provided on the outside exposure surface of the first member to cover the spring, wherein the spring cover has an erected wall part that crosses the outside exposure surface of the first ember, the first member has on the outside exposure surface an erected wall surface that is opposed to an external surface of the erected wall part of the spring cover, the first member has on the erected wall surface an attachment protrusion that is fitted into an attachment hole formed in one member of the seat back-side member and the seat cushion-side member, the spring cover has on the erected wall part a protrusion with an elastic force to press-contact the erected wall surface of the attachment protrusion, and the spring cover is pressed against a surface (an erected wall surface) to be press-contacted to the outside exposure surface of the first member to fix the spring cover.

According to the first reclining device, the spring cover has the erected wall part that crosses the outside exposure surface of the first member, the first member has on the outside exposure surface the erected wall surface that is opposed to the external surface of the erected wall part of the spring cover, the first member has on the erected wail surface the attachment protrusion that is fitted into the attachment hole formed in one member of the seat backside member and the seat cushion-side member, the spring cover has on the erected wall part the protrusion with an elastic force to press-contact the erected wall surface of the attachment protrusion, and the spring cover is pressed against the surface to be press-contacted to the outside exposure surface of the first member to fix the spring cover, whereby the spring cover can be easily assembled to the reclining device.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A reclining device comprising:
   a first member attached to one member of a seat back-side member and a seat cushion-side member, and having a penetration hole;
   a second member fitted into the first member so as to be capable of relative rotation with respect to the first member, and attached to the other member of the seat back-side member and the seat cushion-side member;
   a lock mechanism configured to cause a locked state in which relative rotation of the first and second members is controlled or an unlocked state in which the relative rotation is enabled;
   an operation member disposed on an axis of the relative rotation, the operation member having a protrusion protruding outward from the penetration hole of the first member, and configured to rotate to switch the lock mechanism between the locked state and the unlocked state;
   a spring disposed at the first member so as to be at least partially exposed to the outside, locked at one end part on the first member, locked at the other end part on the protrusion of the operation member, and biases the operation member to bring the lock mechanism into the locked state; and
   a spring cover covering the spring, the spring cover having: a bottom part, and an outer peripheral surface including a continuous wall surface erecting from the bottom part toward the first member, a surface of the spring cover facing the bottom part being an open surface,
   wherein the first member includes a plurality of attachment protrusions,
   the spring cover includes an elastic protrusion, and
   the elastic protrusion of the spring cover is brought into press-contact with one of the plurality of attachment protrusions of the first member to bring the outer peripheral surface of the spring cover into contact with another one of the plurality of attachment protrusions, such that the spring cover is fixed to the first member.

2. The reclining device according to claim 1, wherein the elastic protrusion of the spring cover is bent from an end part of the outer peripheral surface on the side of the open surface to extend in a direction away from the outer peripheral surface of the spring cover and then run in a direction away from the open surface.

3. The reclining device according to claim 1, wherein the elastic protrusion of the spring cover is cut and raised from an intermediate part of the outer peripheral surface of the spring cover, and a leading end part of the elastic protrusion extends in a direction away from the outer peripheral surface of the spring cover.

4. The reclining device according to claim 1, wherein the elastic protrusion of the spring cover protrudes in a direction away from the outer peripheral surface of the spring cover.

5. The reclining device according to claim 1, wherein side surfaces of the plurality attachment protrusions of the first member have a protrusion protruding toward the outer peripheral surface of the spring cover.

6. The reclining device according to claim 1, wherein the outer peripheral surface of the spring cover comes closer to the side surface of the attachment protrusion of the first member as the outer peripheral surface runs from the bottom part toward an end part of the outer peripheral surface on the side of the open surface.

7. The reclining device according to claim 1, wherein the plurality of attachment protrusions of the first member is engaged with a hole formed in one member of the seat back-side member and the seat cushion-side member.

8. The reclining device according to claim 1, wherein the number of the plurality of attachment protrusions is three.

\* \* \* \* \*